United States Patent

[11] 3,594,931

| [72] | Inventor | Kenneth J. Yost<br>R.R. 3, Eaton, Ohio |
|---|---|---|
| [21] | Appl. No. | 783,449 |
| [22] | Filed | Nov. 12, 1968 |
| [45] | Patented | July 27, 1971 |
| [73] | Assignee | Campbell S. Brower<br>a part interest |

[54] APPARATUS FOR EXCAVATING PLANTS
13 Claims, 32 Drawing Figs.

| [52] | U.S. Cl. | 37/2 |
|---|---|---|
| [51] | Int. Cl. | A01g 23/04 |
| [50] | Field of Search | 37/2; 47/37, 37.4 |

[56] References Cited
UNITED STATES PATENTS

| 2,599,087 | 6/1952 | Benison | 47/37.4 X |
| 2,669,065 | 2/1954 | Clegg | 37/2 UX |
| 2,775,428 | 12/1956 | Monthan | 37/2 |
| 2,779,111 | 1/1957 | Cartwright | 37/2 |
| 2,863,258 | 12/1958 | Gish | 37/2 |
| 2,964,860 | 12/1960 | Daniels, Jr. | 37/2 |
| 2,989,335 | 6/1961 | North | 37/2 UX |
| 3,017,708 | 1/1962 | Gardner | 37/2 |
| 3,129,521 | 4/1964 | Pollock | 37/2 |
| 3,163,944 | 1/1965 | Whitcomb | 37/2 |
| 3,284,932 | 11/1966 | Wendlandt | 37/2 |

*Primary Examiner*—Edgar S. Burr
*Attorney*—Walter Becker ABSTRACT: A method and apparatus for excavating plants, especially shrubs and trees, in which a vertical digging cylinder, is provided, which is split longitudinally and is arranged to be opened and placed around a plant and then closed. The cylinder is then driven vertically into the ground. A cut is then made at the bottom of the cylinder to cut off the plug of ground taken by the cylinder and the plant and plug of ground can then be lifted and transplanted in a selected location.

The cylinder has a sleeve of wrapping material, tar paper, for example, therein which contains the periphery of the plug while a bottom cap is placed on the sleeve after the plant and plug are lifted from the hole.

The apparatus forms an attachment on the front end of a straddle-type vehicle so the apparatus can be moved about in a plant nursery or the like and an operator in an operator's station on top of the vehicle can observe the apparatus and control the operation thereof.

INVENTOR.
KENNETH J. YOST

INVENTOR.
KENNETH J. YOST
BY
Walter Becky

APPARATUS FOR EXCAVATING PLANTS

The present invention relates to a method and apparatus for excavating plants, especially shrubs and trees.

The growing of trees in a nursery and the transplanting thereof is a relatively large business. In transplanting trees it is important to take a ball or plug of ground with the tree root system to insure that the transplanted tree will live and grow. Also, with a proper ball or plug of earth, the plant can be stored for a substantial length of time, after digging and before planting, without the plant deteriorating.

The digging, or excavating, of a plant such as a tree or shrub is normally done manually and such an operation involves considerable time and labor and the tree, if of substantial size, is extremely heavy and difficult to move about with the ball or plug of ground thereon.

The present invention has, as a primary object, the provision of a method and apparatus for carrying out such digging, or excavating, operations on plants, especially trees, in which the labor and time normally expended is greatly reduced while superior results are obtained.

A further object of this invention is the provision of a mobile apparatus for the purposes referred to.

A particular object of the invention is the provision of a method and apparatus of the nature referred to in which the tree has a precisely sized plug of ground thereon which makes planting thereof easy.

SUMMARY OF THE INVENTION

The present invention utilizes a straddle-type vehicle with the digging or excavating device movably mounted on the front, side or rear.

The excavating device comprises a vertical cylinder made up of halves which can be opened to receive a plant and closed around the plant. When the cylinder is closed around the plant, it is forced into the ground, as by a vibratory, a constant pressure, or a rotative force, or some combination of these forces. When the cylinder reaches the desired depth a cutoff mechanism connected to the bottom of a rotary sleeve mounted in the cylinder cuts off the plug of ground at the lower end of the cylinder, whereupon the cylinder and the plug taken thereby can be lifted from the ground; the plant, of course also being lifted.

The rotary sleeve is arranged to receive a sleeve or cylinder of wrapping material to contain or enclose the plug of ground so that after the plug and plant are lifted out of the ground, the cylinder can be opened and release the plug and plant, for example, to a conveyor or vehicle, and the wrapping material will encapsulate to prevent the plug from breaking up. The lower end of the wrapping cylinder may be capped with a bottom and the plug can then be kept moist.

A tree taken in the manner described can easily be planted in a cylindrical hole and will be upright and with the least chance of dangerous air pockets about the plug which might inhibit root growth.

The foregoing objects, as well as other objects, and advantages, of the present invention will become more apparent upon reference to the following detailed specification, taken in connection with the accompanying drawings, in which.

DETAILED DESCRIPTION

Figure 1:
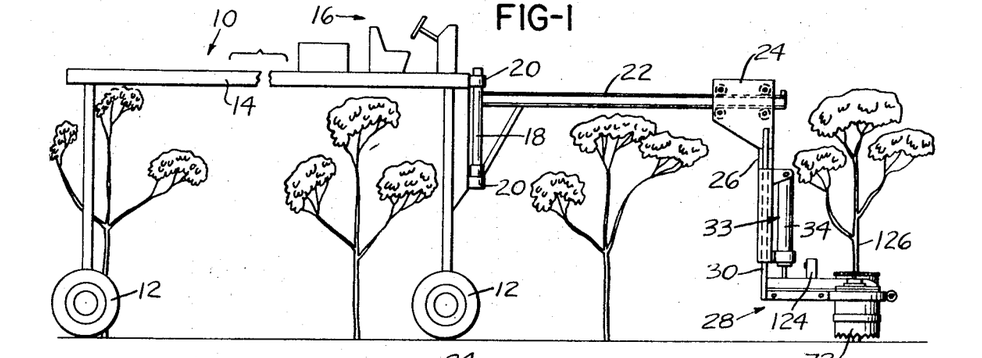
FIG. 1 is a side elevational view of one modification of the invention.

Referring to the drawings in more detail, in FIG. 1, 10 designates a straddle-type, or "highboy" vehicle having wheels 12 and an elevated platform 14 on which, at the front end of the vehicle, is an operator's station 16.

A vertical post 18 is pivotal in bearings 20 on the front of the vehicle and carries a horizontal boom 22 along which is slidable a main frame comprising, a carriage or trolley 24, and a structure 26 dependent therefrom. At the bottom of structure 26 is a horizontal support frame generally designated 28.

Support frame 28 has vertical posts 30 guided in bearings 32 on main frame structure 26. Structure 26 also carries a motor 33 comprising a cylinder 34 which has a piston therein, the rod 36 of which is attached to support frame 28 for moving the latter vertically relative to structure 26.

Figure 4:
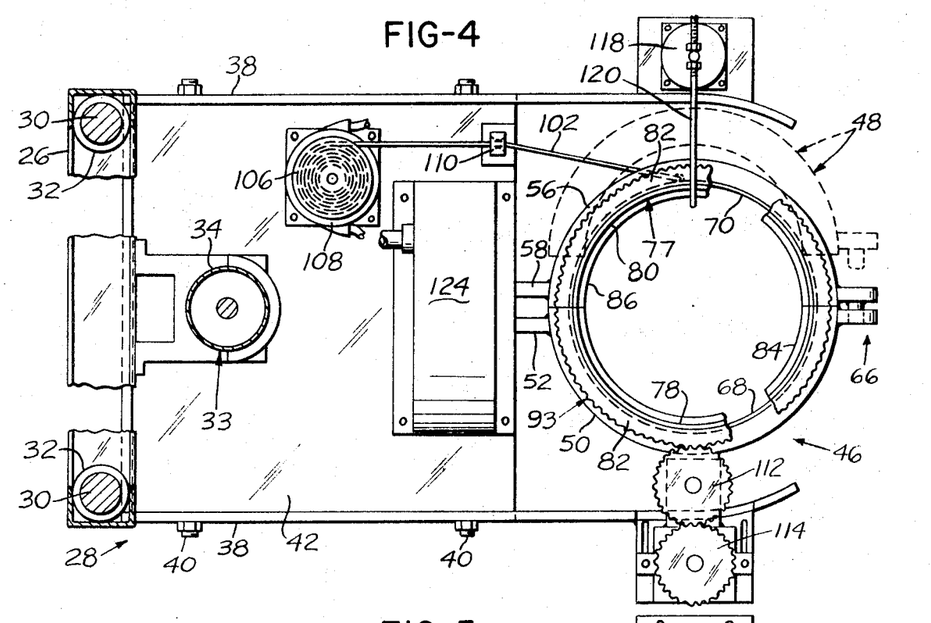
FIG. 4 is a plan section indicated by line IV–IV on FIG. 2.
Figure 5:
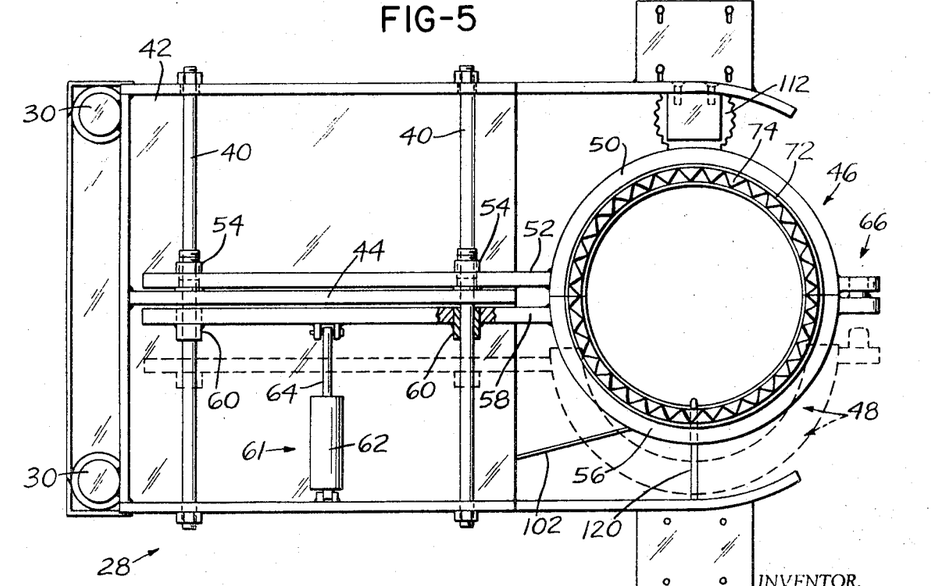
FIG. 5 is a view looking up from beneath FIG. 2 and drawn at the same scale as FIG. 4.

Support frame 28, best seen in FIGS. 4 and 5 has side rails 38 fixed together by lateral rods 40. Attached to the top of rails 38 is a plate 42 and a central rib 44 under the plate makes for a rigid assembly.

Between the ends of rails 38 remote from posts 30 are arranged two cylinder halves, 46 and 48, which together, make up the digging or excavating cylinder. Cylinder half 46 is supported by a bar 50 bent to a half circle and fixed to the end of a bar 52 extending parallel to central rib 44 and fixed in place by nuts 54 on rods 40.

Cylinder half 48 is supported by a bar 56 bent to a half circle and fixed to the end of a bar 58 also extending parallel to rib 44 on the side thereof opposite bar 52. Bar 58 is slidable on rods 40, by means of bearings 60, and a motor 61 comprising a cylinder 62 connected to the adjacent rail 38 and having a ram 64 connected to bar 58 is adapted to move bar 58 and cylinder half 48 between the dotted line and full line positions thereof as shown in FIGS. 4 and 5. When the cylinder halves are separated, the digging cylinder can be placed about a tree to be excavated and the cylinder can then be closed by moving the cylinder halves toward each other. Pin and socket means at 66 on the outer ends of bars 50 and 56 insure registration of the cylinder halves when the cylinder is closed. It will be understood that both cylinder halves could be moved laterally for greater opening of the cylinder, if desired.

Figures 2, 3:
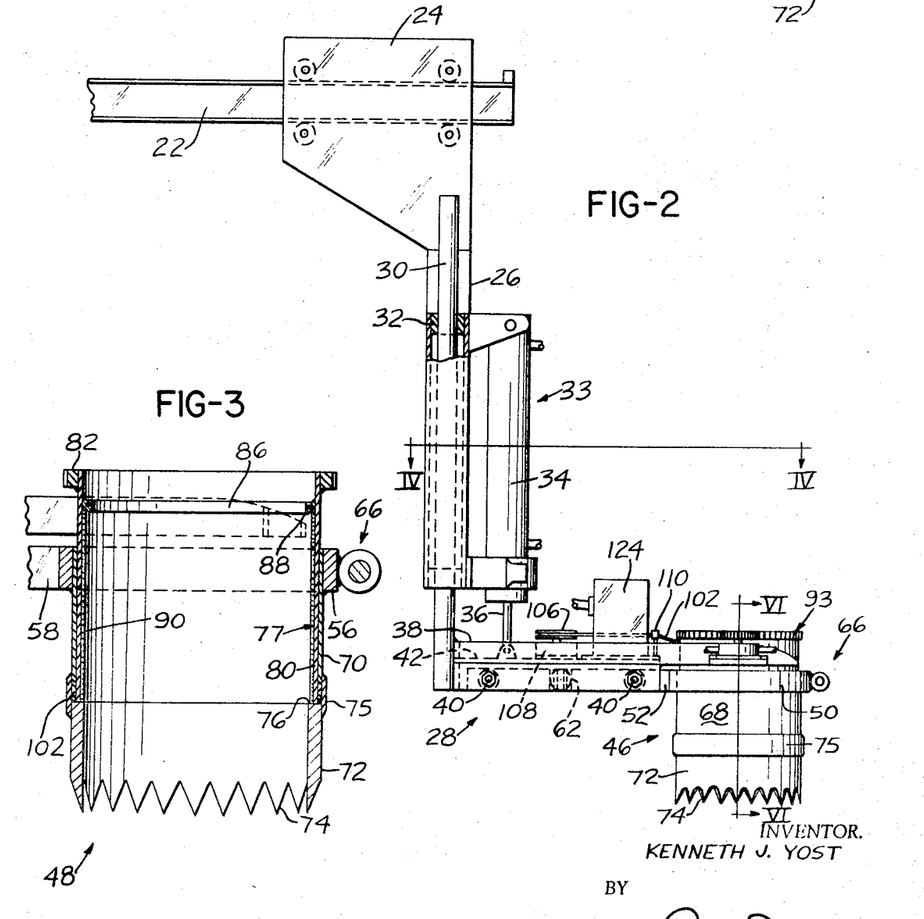
FIG. 2 is a fragmentary view drawn at enlarged scale showing the digging cylinder of the apparatus and its supporting structure.
FIG. 3 is a longitudinal sectional view through the digging cylinder drawn at enlarged scale and looking at the cylinder in the same direction as in FIG. 2.

As will be seen in FIGS. 3 and 4, the cylinder referred to, and consisting of halves 46 and 48, comprised of half cylinder portion 68, connected to bar 50 and half cylinder portion 70, connected to bar 56 and making up the main cylinder. At the lower end of each half cylinder portion is a respective half cylinder digging edge 72 having teeth 74, fixed in place by strip 75. The digging edges 72 may be made up of multiple segments with, for example, one tooth to each segment. Edges 72 are thicker than portions 68 and 70 and form an upwardly facing shoulder 76 in the digging cylinder. The lower ends of the teeth may be bevelled, if desired.

A further cylinder, or sleeve 77, is rotatably mounted inside the main cylinder and is also in the form of halves 78 and 80. The sleeve 77 projects upwardly from the main cylinder, and carries half gears 82 which form a complete gear 93 when the digging cylinder is closed.

Inside sleeve 77 are respective half rings 84, 86 forming downwardly facing shoulder 88 in the cylinder.

Figures 6, 7, 8:
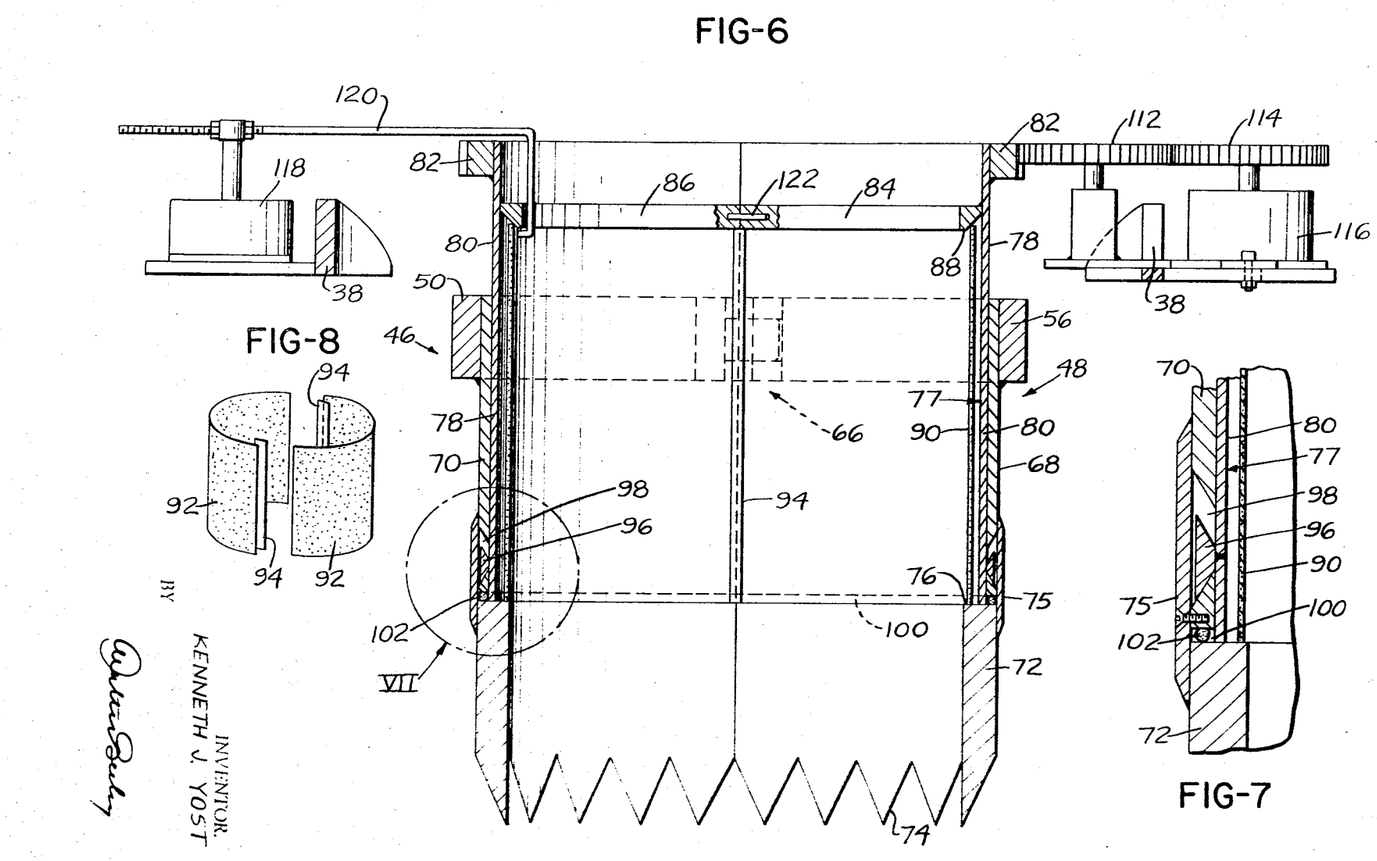
FIG. 6 is a section indicated by line VI–VI on FIG. 2 and drawn at enlarged scale.
FIG. 7 is a fragmentary view drawn at enlarged scale showing that portion of the digging cylinder inside the dot-dash circle marked VII in FIG. 6.
FIG. 8 is a perspective view showing how a wrapping sleeve is formed for placing in the digging cylinder.

The space between shoulders 76 and 88 is adapted to receive a cylinder or sleeve of wrapping material, referred to as a "pot cylinder" for the plug of ground taken by the digging cylinder in an excavating operation. This sleeve is designated 90 and may be made up, as shown in FIG. 8, by taping pieces 92 of, for example, tar paper, together by adhesive strips 94.

A stop ring means 96 on sleeve 77 projects into gap 98 at the bottom of the main cylinder and permits a small amount of vertical movement of the sleeve made up of halves 78, 80 in the main cylinder.

At the extreme bottom of the main cylinder is an annular space 100 which is closed when sleeve 77 is in its lowermost position in the main cylinder and exposed when sleeve 77 is in its uppermost position in the main cylinder. A cable 102 has one end connected to a point 104 on the bottom of sleeve 77 and leads therefrom into space 100 and then through the wall of the main cylinder into vertical guide channel 105 on the outside of the main cylinder. From the upper end of guide channel 105, cable 102 leads to winch drum 106 driven by rotary motor 108 which is mounted on plate 42. Guide rollers, or eyes, one of which is shown at 110, may guide cable 102 around bends between winch drum 106 and sleeve 77.

A gear train comprising gears 112 and 114 connect gear 93 on the upper end of sleeve 77 with rotary motor 116 mounted on the rail 38 which is adjacent one-half of the digging cylinder. In case both cylinder halves move laterally, motor 116 would be mounted to move with its respective cylinder half.

A reciprocable motor 118, on the other rail 38 activates a hook member 120 that reaches down inside the top of sleeve 77 and engages under shoulder 88 so the sleeve 77 can be lifted in the main cylinder. Such lifting of sleeve 77 is possible because the respective halves 78 and 80 thereof are pinned together when closed, as by pin means 122 (FIG. 6). Two of the hook members 120 can be used, one on each side of the sleeve, if desired, to prevent the sleeve from cocking in the main cylinder when reciprocated therein.

A vibrator 124, mounted on plate 42 near the digging cylinder, when energized, vibrates the entire support structure including the digging cylinder. Cylinder 34 can be supplied with pressure at the same time to force the digging cylinder into the ground.

OPERATION OF EMBODIMENT OF FIGURES 1—17

Figure 9:
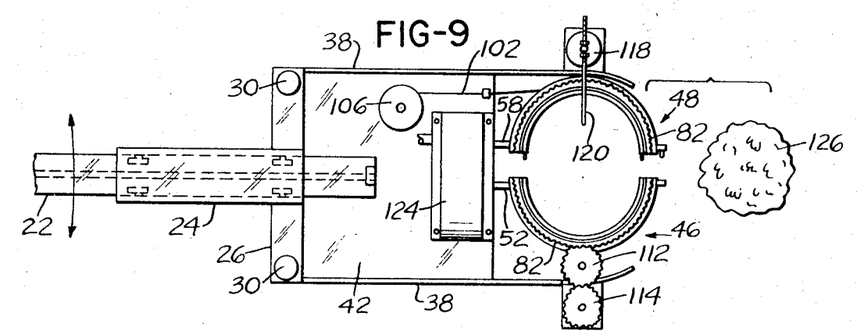
FIG. 9 is a schematic plan view like FIG. 4 but drawn at reduced scale showing the cylinder open to receive a plant.
Figures 10, 11, 12:
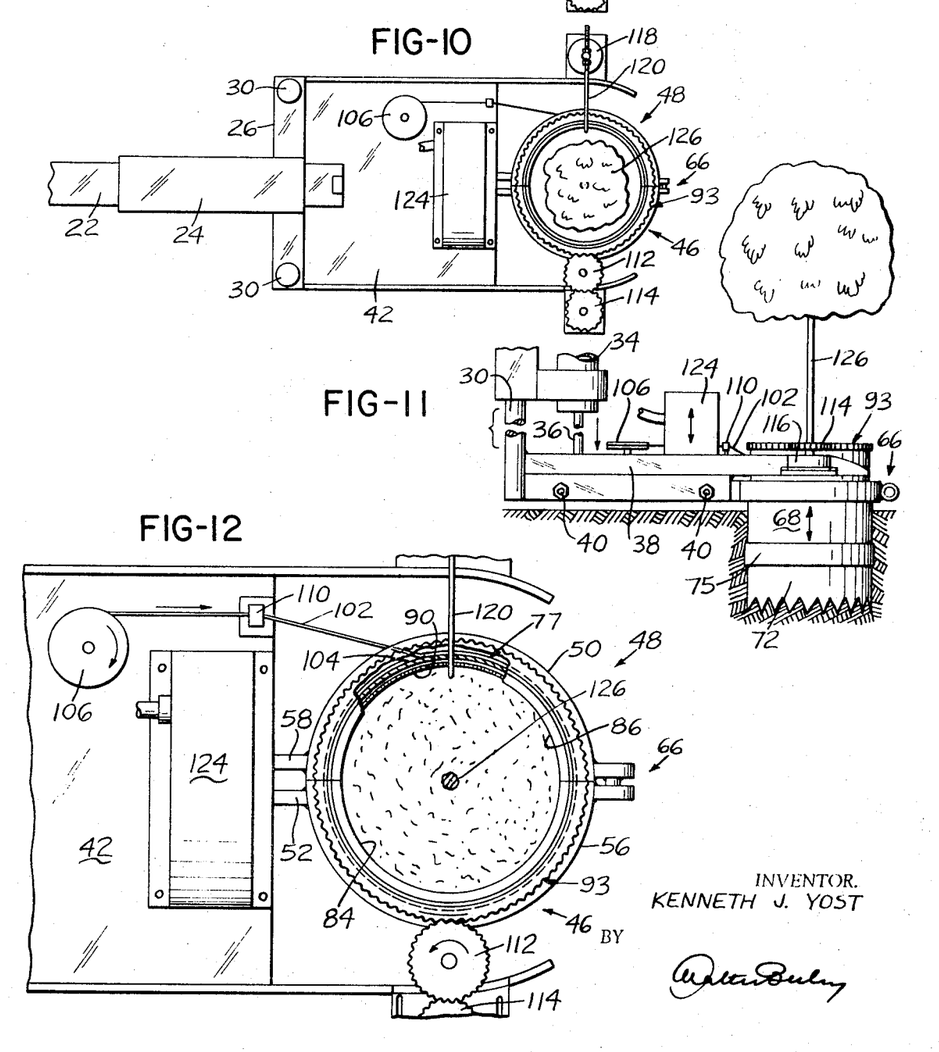
FIG. 10 is a view like FIG. 9 but shows the cylinder driven into the ground around a plant.
FIG. 11 is a side view showing the closed cylinder driven into the ground around a plant.
FIG. 12 is a plan view showing a cable-type cutoff arrangement for cutting off the plug of ground taken by the digging cylinder.
Figure 13:
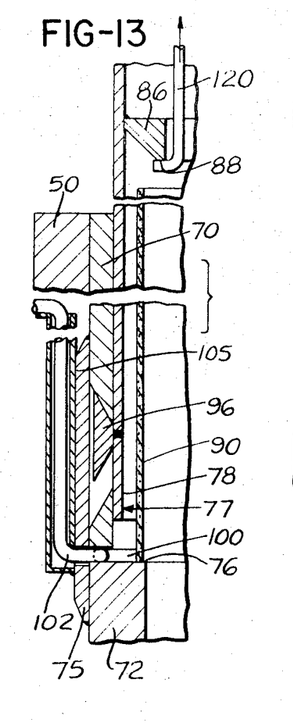
FIG. 13 is a fragmentary sectional view showing details of the cable cutoff of FIG. 12.
Figure 14:
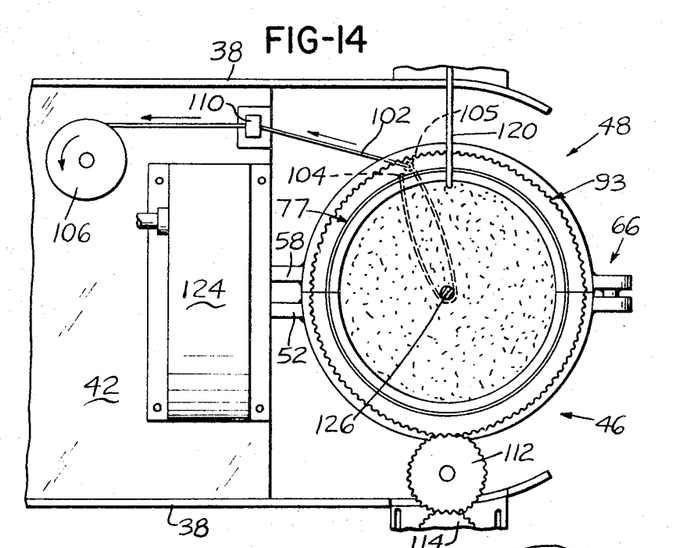
FIG. 14 is a plan view like FIG. 12 but shows the cable in a cutting off operation.
Figures 15, 17:
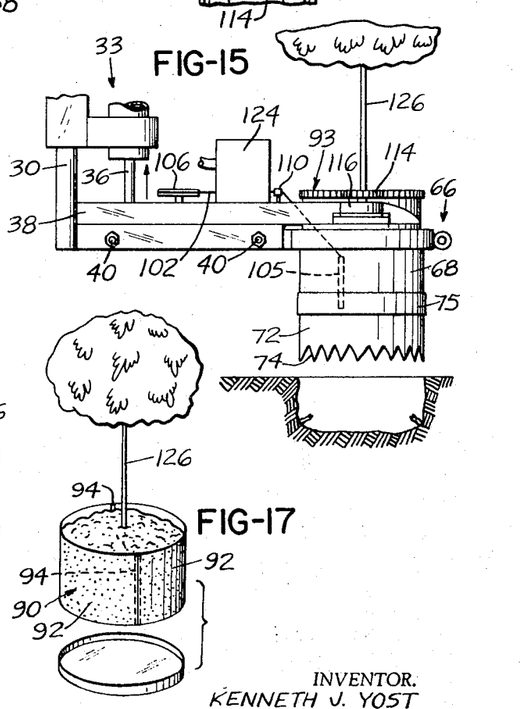
FIG. 15 shows the excavated plant being lifted from the ground together with the plug of ground taken by the cylinder.
FIG. 17 is a perspective view showing the released excavated plant with the sleeve of wrapping material on the ground plug and also showing the bottom cap for closing the bottom end of the sleeve.
Figure 16:
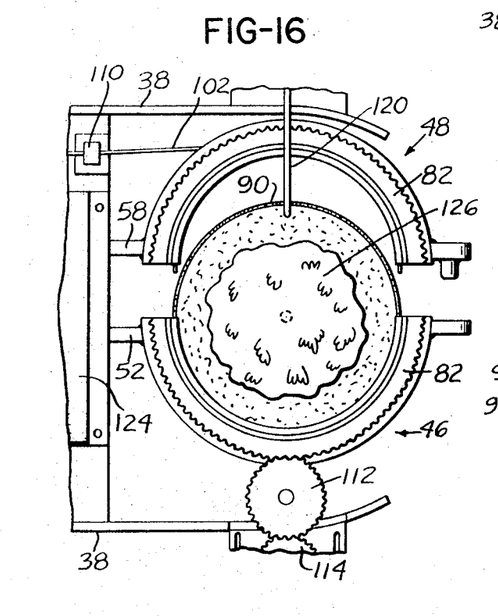
FIG. 16 is a plan view showing the cylinder opened to release the excavated plant.

In operation, the digging cylinder is elevated by motor 33 and is opened, by motor 61, into the position shown in FIG. 9, and is advanced so as to embrace tree 126. This advance is by way of moving the vehicle or by sliding carriage or trolley 24 along boom 22, the boom being swing laterally on the axis of its support post 18 if necessary to center the cylinder about the tree.

Motor 61 is then reversed to close the digging cylinder and motor 33 is reversed to set the cylinder down on the ground. The cylinder of wrapping material or pot cylinder is then placed in sleeve 77, or the halves of the pot cylinder previously placed in the sleeve 77 are taped together. Vibrator 124 is then energized to cause the digging cylinder to advance downwardly into the ground. Motor 33 may remain energized during this period.

When the digging cylinder is advanced to the desired depth, sleeve 77 is rotated by motor 116 to draw the cable 102 around the lower end of the sleeve in space 100 at the bottom of the main cylinder. Optionally, this operation can be carried out at any time after the cylinder closes about the tree.

With cable 102 wound around the lower end of sleeve 77, motor 118 actuates hook means 120 to lift cylinder 77 upwardly to expose space 100. Motor 108 is then energized to rotate winch drum 106 to draw cable 102 inwardly and this will cause the cable to make a horizontal cut across the bottom of the cylinder to cut off plant roots extending below that depth and to cut off the core of ground taken by the cylinder to make the plug.

The tree and plug can then be lifted from the ground by reversing motor 33. If a receiver such as a conveyor or vehicle is adjacent the apparatus, the tree can be set directly thereon and thereby all manual handling of the tree avoided. The tree and plug is released by again opening the cylinder. Opening of the cylinder will also release the pot cylinder which, as mentioned previously, is adapted for receiving a lower end cap. This bottom cap may be applied by setting the tree on a sheet of wrapping material and then flange-forming the sheet edge upwardly at the base of the pot cylinder and stapling or taping bottom flange to lower end of pot cylinder.

The apparatus is prepared for a new excavation cycle by closing the cylinder and rotating sleeve 77 back to its starting position and lowering the sleeve 77 to its lower position.

EMBODIMENT OF FIGURES 18 to 24

FIGS. 18 to 24 show a modification wherein the digging cylinder takes a somewhat different action than that of the previously described modification.

Figures 18, 19, 20, 21, 22:
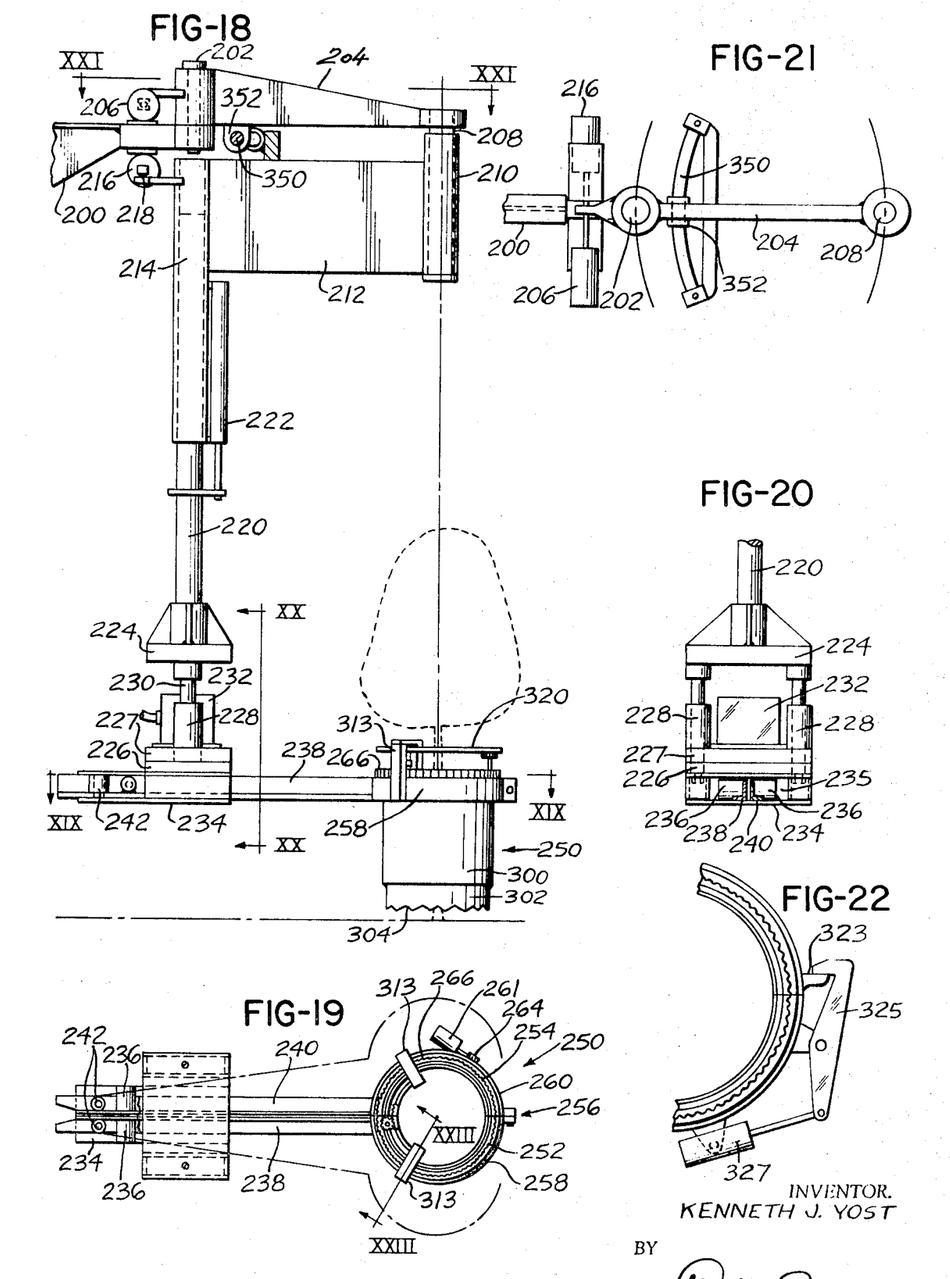
FIG. 18 is a fragmentary side view of a modification.
FIG. 19 is a plan section indicated by line XIX–XIX on FIG. 18.
FIG. 20 is a vertical section indicated by line XX–XX on FIG. 18.
FIG. 21 is a view looking down on top of FIG. 18.
FIG. 22 is a fragmentary view showing a latch for holding the halves of the digging cylinder together.

In FIG. 18, numeral 200 represents the support arm leading forwardly from the tractor-type vehicle and supported thereby. A pivot at 202 supports an arm 204 on the outer end of arm 200. A motor 206, preferably a fluid motor, is connected between arms 200 and 204, for the purpose of swinging arm 204 about the axis of pivot 202. At its outer end arm 204 has a pivot member 208 dependent therefrom, which supports, as by sleeve 210, a support member 212, which extends backwardly beneath arm 204 and has connected thereto a vertical guide sleeve 214 which, in one lateral position, is coaxial with pivot 202. A second fluid motor 216 is connected between arm 200 and sleeve 214 and is operable for moving sleeve 214 in a direction perpendicular to the plane of FIG. 18. For this purpose the connection of motor 216 with sleeve 214 is by way of a pivotal connection 218, such as a ball and socket connection, for example.

Sleeve 214 reciprocably receives a plunger 220, the axial position of which in sleeve 214 is under the control of a fluid motor 222. At its lower end, plunger 220 carries the upper plate 224 of a vibrator unit, somewhat like a die set and which unit also comprises a lower plate 226. A further reciprocable plate 227 has guide bushings 228 attached thereto which receive guide plungers 230 carried by plates 224 and 226. A fluid air, electric, ultrasonic, mechanical, or other vibrator unit 232 is mounted on plate 227 and is operable for vibrating plate 227 in a vertical direction for delivering impacts to plate 226 and, thus, to the digging cylinder.

As will be seen in FIGS. 18, 19 and 20, a further plate 234 is connected to lower plate 226 of the impactor unit in spaced relation thereto so that a space 235 is provided within which a pair of arms 238 and 240 can move laterally, while the impactor unit is still operable for delivering impacts to the said arms.

The arms are pivotally connected as at 242 to a rearward extension of plate 234 and respective motors 236 are connected between plate 234 and the arms 238 and 240 for swinging the arms laterally toward and away from each other.

At their outer ends the arms 238 and 240 are connected with respective halves of a digging cylinder generally designated 250, and of a type quite similar as to what has been described heretofore.

The digging cylinder comprises the half 252 carried by arm 238 and the half 254 carried by arm 240 and adapted for being opened and closed by relative lateral movement of arms 238 and 240. Pin and socket means at 256 key the cylinder halves together when they are closed. Cylinder half 252 receives its main support from a semicircular bar 258 connected to the end of arm 238, while cylinder half 254 receives its main support from a semicircular bar 260 fixed to the end of arm 240. One of the semicircular bars carries a fluid motor 261, which drives a worm 264 meshing with worm wheel 266 made up of a semicircular worm wheel segment on each internal cylinder half 306. When the cylinder halves are closed, the semicircular worm wheel segments meet and form a continuous worm wheel so that the internal cylinder 306 can be rotated within the support provided therefor by the circular bars 258' and 260' directly above circular bars 258 and 260, as well as by outer cylinder halves 300.

Figure 23:
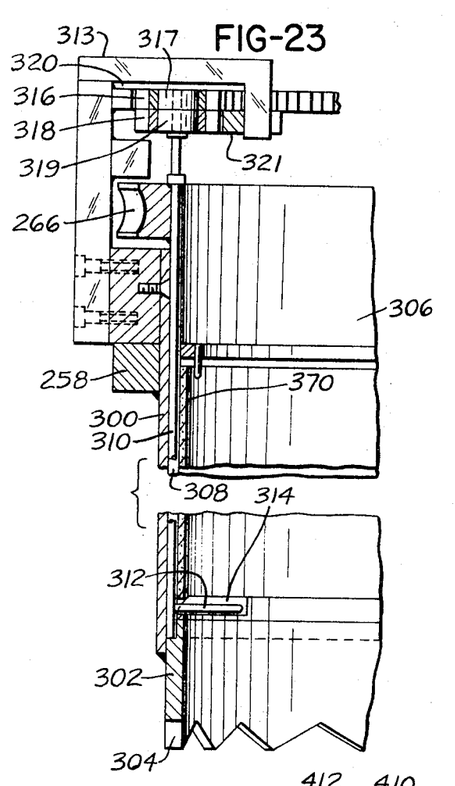
FIG. 23 is a fragmentary vertical section indicated by line XXIII–XXIII on FIG. 19.

Reference to FIG. 23 will show details of the cylinder half carried by bar 258 and which is representative of the other cylinder half also. In FIG. 23, it will be noted that bar 258 is welded to sleeve 300 forming the outside of the respective cylinder half. At its lower end sleeve 300 carries the digging element 302, which is also semicircular and which has sharpened teeth 304 on the bottom. Rotatably mounted inside sleeve 300 is another sleeve 306, which is connected to the respective segments of worm wheel 266. Sleeve 306 has a slot 308 for receiving a vertical bar 310. At its lower end vertical bar 310 has a cutter rod 312 connected thereto and extending arcuately around the inside of the digging cylinder in a slot 314 provided therefor. At its upper end rod 310 has gears 316 and 318 mounted thereon by means of slip clutches 317 and 319, respectively. Meshing with gears 316 on one side is a stationary gear segment 320 extending about an arc of about 310°—320°. Meshing with gears 318 on the other side is a shorter stationary gear segment 321 which spans the gap in segment 320. When the cylinder is rotated, segment 320 and gear 316 swing the knife 312 out to cut off the plug and, during the final part of one complete rotation of the cylinder, segment 321 and gear 318 swing the knife 312 back to its retracted position. The slip clutches permit the gears 316, 318 to rotate after the knife 312 reaches a limit position in the respective directions. Support brackets 313 support the gear segments on the outer part of the digging cylinder so driving of sleeve 306 will carry gears 316, 318 along their respective gear segments. It will be appreciated that a single gear could replace gears 316, 318 if gear segments 320, 321 were coplanar and did not overlap at the ends.

FIG. 22 shows how one cylinder half could carry a lug 323 for engagement by a hook lever 325 pivoted to the other cylinder half to hold the cylinder halves in closed position. Fluid motor 327 connected to lever 325 moves the lever between latching and unlatching positions.

In operation of the modification of FIGS. 18—24, the main digging cylinder is opened and placed around the tree or other plant to be dug out and the cylinder is then closed and set down on the ground about the plant. The impactor can then be energized to supply impact to the cylinder. With the impactor operating and the cylinder either set down on the ground, or pressed down on the ground by motor 222, motor 216 is energized reversibly for swinging sleeve 214 back and forth. This will cause a rocking of the digging cylinder on the ground and will increase the rate at which it penetrates into the ground and without any rotation of the digging cylinder being required.

As will be seen in FIGS. 18 and 21, additional support may be provided between arm 204 and the structure dependent therefrom as by the arcuate rod 350 carried by the upper part 212 of the depending structure and which rod 350 is slidable in a support bushing 352 mounted on the bottom of arm 204 close to pivot 202.

Figures 24, 32:
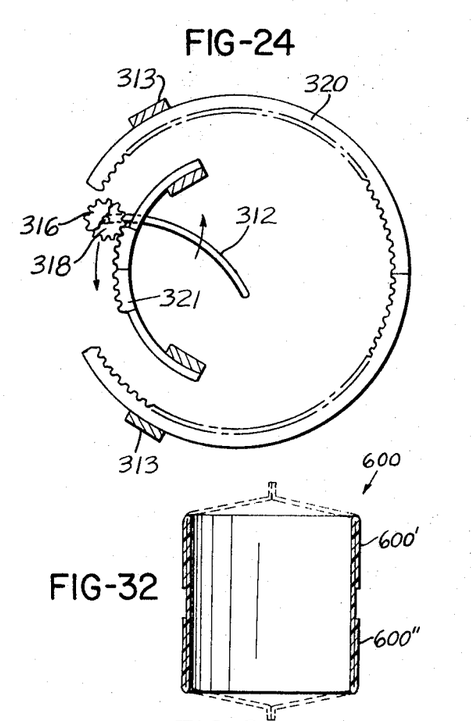
FIG. 24 is a fragmentary plan view of a modification.
FIG. 32 shows a modified "pot cylinder".

When the digging cylinder has reached the desired depth, motor 261 connected to worm 264 is energized to rotate sleeve 306, FIGS. 23 and 24, thereby to actuate the cutter knife 312 to cut off the plug and roots at the bottom of the plug so the plant can be lifted from the ground.

In the modification described a pot cylinder 370 is provided inside the main digging cylinder as has been described previously.

Figure 25:
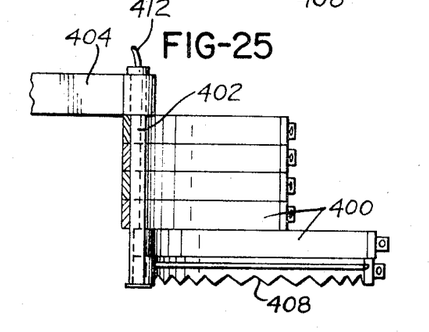
FIG. 25 is a schematic vertical section of a modified arrangement.
Figure 26:
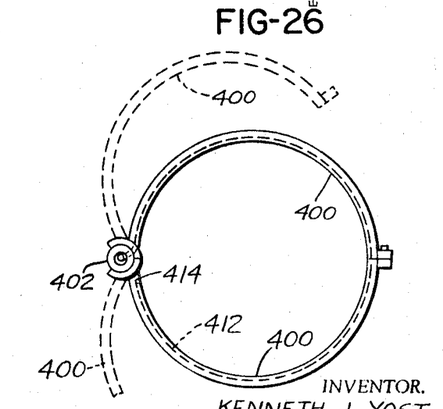
FIG. 26 is a plan view of FIG. 25.
Figure 27:
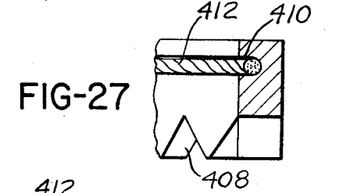
FIG. 27 is a fragmentary view showing how the cutoff cable is carried by the bottom member in the modification of FIGS. 25 and 26.

Turning now to the modification of FIGS. 25 to 27, in certain cases a plant to be excavated, such as a spreading shrub, does not have space for placing a digging cylinder thereabout. In such a case, the digging cylinder could be segmented as shown in FIGS. 25 and 26. In these figures a plurality of relatively axially short semicircular cylinder members 400 are provided which are pivoted on a pivot post 402 carried on the outer end of vibrator support arm 404. The short cylinder halves 400 are progressively closed individually as the cylinder is worked into the ground. The lowermost one of the set of axially short cylinder halves has a sharpened digging edge thereon as indicated at 408.

In operation, one or two of the axially short cylinder halves are closed about the plant beneath the spreading branches thereof and are driven into the ground and then others of the short cylinder halves are successively closed until a plug of the proper depth has been taken.

For cutting off the plug at the bottom, the lowermost section of the cylinder consisting of two halves may be provided with an annular groove 410 (FIG. 27) and when the cylinder sections are first closed about the plant and before digging has commenced, a cutoff cable 412 is placed in this groove. The cable will remain in the groove during the digging by the cylinder. The cable 412 is fixedly connected at 414 to one of the lowermost semicircular cylinder sections 400, while the other end extends upwardly through the center of post 402. After the cylinder has been pressed to the proper depth, cable 412 is pulled upwardly and this will close the loop of cable carried by the lowermost section of the digging cylinder and cut off the plug at the bottom. The cylinder segments may be kept closed by any suitable means, such as latches provided on the ends of the segments where the segments meet.

Figure 28:
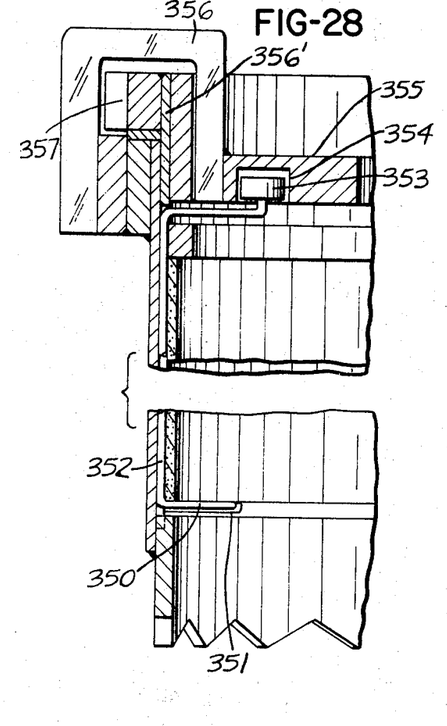
FIG. 28 is a sectional view like FIG. 23 but showing a modification.
Figure 29:
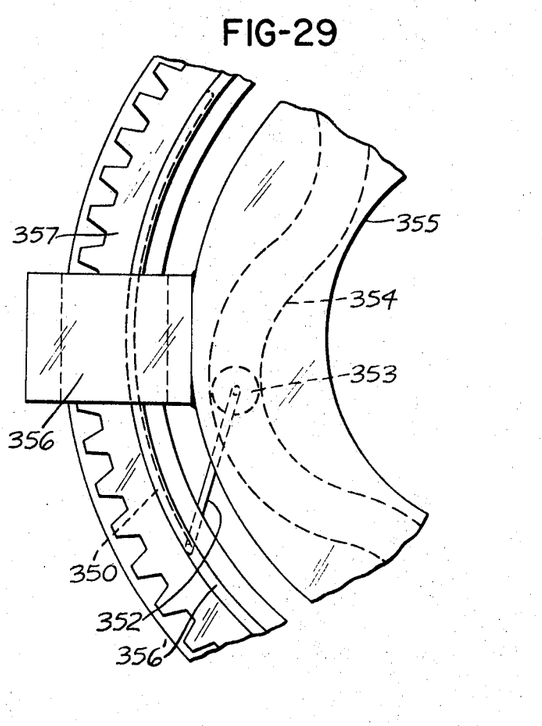
FIG. 29 is a plan view of FIG. 28.

Referring now to FIGS. 28 and 29, a novel knife actuating system is shown. Knife 350 in FIGS. 28 and 29 is disposed in a notch 351 in the cylinder and is connected to a rod 352. At the upper end, rod 352 extends radially and has a roller 353 which engages a cam track 354 in a cam ring 355 stationarily supported by bracket 356 on the stationary part of the cylinder. Rotation of the inner sleeve 356' by gear 357 will cause knife 350 to cut off the plug at the bottom. Gear 357 may be a spur gear or a worm wheel, as may be desired.

Figure 30:
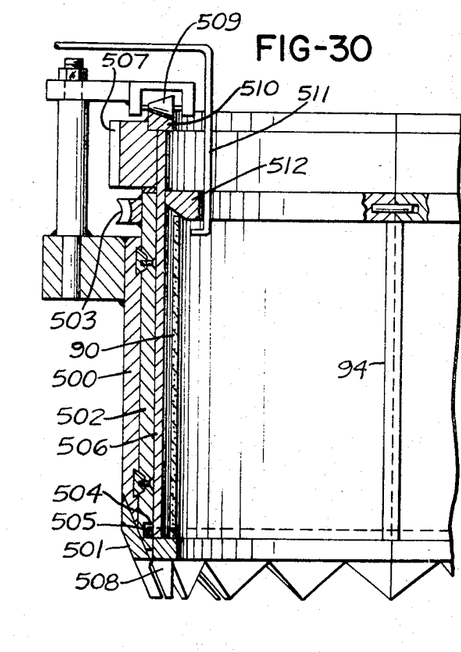
FIGS. 30 and 31 are fragmentary vertical sectional and plan views, respectively, of a modification.
Figure 31:
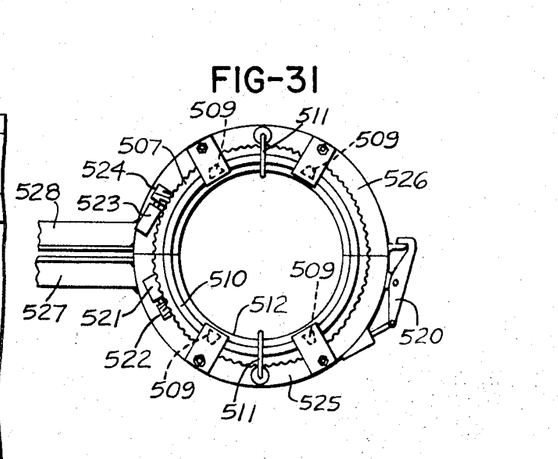

In FIGS. 30 and 31 there is shown an arrangement having a stationary outer sleeve 500 with a stationary cutter ring 501 on the bottom. A first inner sleeve 502 has a worm wheel 503 at the top and a notch 504 at the bottom. Notch 504 receives cutoff cable 505 which operates as described earlier. A second inner sleeve 506 has a worm wheel 507 at the top and a cutter ring 508 at the bottom. Ring 508 cooperates with ring 501 so as to cut off roots while the cylinder sinks into the earth. Sleeve 506 preferably rotates continuously as digging is carried out.

When the cylinder has reached the proper depth, hold down rollers 509 are swinging away from thrust ring 510 on the upper end of sleeve 506 and lift hook means 511 can then lift sleeve 506 upwardly by lifting on pot cylinder hold down collar 512. Cable 505 is now exposed for a cutoff operation which is carried out as previously described. After a cutoff operation, worm wheel 503 is used to rewrap the cable into its notch 504 preparatory to another digging operation.

The outer and inner sleeves and the worm wheels are all in the form of semicircular members so the cylinder can be open and closed, as in other modificatons.

A latch 520 is provided to hold the cylinder halves closed. Fluid motor 521 drives worm 522 for worm wheel 503 while fluid motor 523 drives worm 524 for worm wheel 507.

The cylinder halves are supported by the half rings 525 and 526 which, in turn, are fixed to the ends of laterally swingable support arms 527 and 528.

FIG. 32 shows a modified "pot cylinder" 600 which may consist of polyethylene and has cuffs 600' and 600" adapted to be folded upwardly and downwardly as indicated by dash lines and to be closed by string, wire, or the like to thereby close the plug on all sides.

Further, it will be evident that the apparatus of any of the modifications could be latched to the frame of the vehicle in retracted idle position for transport so as to unload the system supplying power to the various motors of the apparatus. Modifications and adaptations of the present invention, within the scope of the appended claims, will occur to those skilled in the art.

I claim:

1. An apparatus for excavating plants, such as trees and shrubs and comprising in combination: a main frame, an elongated hollow member open at both ends and vertically reciprocable on said main frame, said hollow member being composed of sections separable laterally to permit said hollow member to be disposed around a plant, means for forcing said hollow member vertically into the ground when disposed around a plant, cutoff means carried by said hollow member near the bottom and adapted for cutting transversely across the bottom of the plug of ground encompassed by said hollow member when it is forced into the ground, said hollow member being a cylinder composed of sections, said main frame being a wheeled mobile frame, a first motor operatively connected between the frame and the cylinder for raising and lowering the cylinder collectively on the frame, a second motor operatively connected to cylinder sections individually for moving said cylinder sections toward and away from each other, said cylinder composed of sections respectively comprising sharp teeth on the bottom edge thereof to facilitate penetration of the cylinder into the ground, a support member being provided for each cylinder section and being connected thereto, a subframe including means movable interconnecting said support members, said subframe being guided on said main frame for vertical reciprocation thereon, said first motor being operatively connected between said main frame and said subframe, said second motor being connected between said support members, vibrator means mounted on said subframe and operable to impose vibrations in the vertical direction on said cylinder to cause it to advance downwardly into the ground, said cylinder having an upwardly facing internal shoulder therein near the bottom for supporting the lower end of wrap material for the plant being excavated, a sleeve including a downwardly facing shoulder above the top for engaging the upper end of wrap material, said cutoff means being disposed in said cylinder in the region of said upwardly facing shoulder so as to cut off said ground plug near the bottom end of said cylinder of wrap material, said cylinder having a segmented sleeve rotatable therein and extending from said upwardly facing shoulder upwardly and beyond the upper end of the cylinder, said downwardly facing shoulder being formed in said sleeve, means for rotating said sleeve in said cylinder, said sleeve being vertically reciprocable a limited amount in said cylinder and said cutoff means being disposed in said cylinder just above said upwardly facing shoulder and being covered by said sleeve when the sleeve is in its lowermost position in said cylinder, said sleeve upon upward movement exposing said cutoff means for operation.

2. An apparatus according to claim 1, in which said cutoff means comprises a cable having one end connected to a point on the bottom of said sleeve, an annular groove in the cylinder just above said upwardly facing shoulder for said cable, said sleeve in its lowermost position covering said groove and when elevated exposing said groove, a channel leading downwardly along the outside of the cylinder and then into said groove, said cable leading from said sleeve into said groove and then along said channel, a winch on said subframe to which the other end of the cable is connected, and means for rotating said sleeve when in its lowered position in said cylinder to draw said cable from said winch along said channel and around the sleeve into the said groove in said cylinder, whereby, upon said cylinder being driven into the ground, said sleeve can be elevated in said cylinder to expose said groove and actuation of said winch will draw said cable in and cut off the plug of ground taken by said cylinder horizontally at the level of said groove.

3. An apparatus according to claim 1, in which said cutoff means comprises a cable, a winch separate from said cylinder and having one end of said cable connected thereto, said cable leading into said cylinder radially outwardly of said sleeve and downwardly to about the level of said upwardly facing shoulder, a second sleeve rotatably surrounding said first mentioned sleeve and at the lower end defining an annular cable groove with said cylinder and which groove is closed on the radially inward side by the lower portion of said first mentioned sleeve when the latter is in its lowered position in said cylinder, said cable having its end adjacent said second sleeve connected to the lower end thereof whereby rotation of said second sleeve will draw said cable around said first mentioned sleeve and in said groove to form a loop around the plug of earth taken by said cylinder, said first mentioned sleeve having teeth on the lower end adjacent the teeth on the bottom edge of said cylinder, and means operable for rotating said first mentioned sleeve to cause the teeth thereon to assist in causing the cylinder to penetrate the ground while the said teeth thereon also cooperate with the said teeth on said cylinder to cut off roots and the like encountered by the bottom edge of said cylinder.

4. An apparatus according to claim 3, which includes holddown means carried by said cylinder and engaging said first mentioned sleeve to hold said first mentioned sleeve against upward movement in said cylinder during a digging operation, said holddown means being disengageable from said first mentioned sleeve to permit upward movement of said first mentioned sleeve in said cylinder to expose said groove whereby said winch can be operated to draw in said cable for a cutoff operation after the cylinder has penetrated the ground to the desired depth.

5. An apparatus according to claim 4, in which said means for rotating said first mentioned cylinder comprises a worm wheel thereon at the upper end, and a worm meshing with said worm wheel.

6. An apparatus for excavating plants, such as trees and shrubs and comprising in combination: a main frame, an elongated hollow member open at both ends and vertically reciprocable on said main frame, said hollow member being composed of sections separable laterally to permit said hollow member to be disposed around a plant, means for forcing said hollow member vertically into the ground when disposed around a plant, cutoff means carried by said hollow member near the bottom and adapted for cutting transversely across the bottom of the plug of ground encompassed by said hollow member when it is forced into the ground, said hollow member being a cylinder composed of sections, said main frame being a wheeled mobile frame, a first motor operatively connected between the frame and the cylinder for raising and lowering the cylinder collectively on the frame, a second motor operatively connected to cylinder sections individually for moving said cylinder sections toward and away from each other, said cylinder composed of sections respectively comprising sharp teeth on the bottom edge thereof to facilitate penetration of the cylinder into the ground, a support member being provided for each cylinder section and being connected thereto, a subframe including means movable interconnecting said support members, said subframe being guided on said main frame for vertical reciprocation thereon, said first motor being operatively connected between said main frame and said subframe, said second motor being connected between said support members, vibrator means mounted on said subframe and operable to impose vibrations in the vertical direction on said cylinder to cause it to advance downwardly into the ground, said cylinder having an upwardly facing internal shoulder therein near the bottom for supporting the lower end of wrap material for the plant being excavated, a sleeve including a downwardly facing shoulder above the top for engaging the upper end of wrap material, said cutoff means being disposed in said cylinder in the region of said upwardly facing shoulder so as to cut off said ground plug near the bottom end of said cylinder of wrap material, said cylinder having a segmented sleeve rotatable therein and extending from said upwardly facing shoulder upwardly and beyond the upper end of the cylinder, said downwardly facing shoulder being formed in said sleeve, means for rotating said sleeve in said cylinder, said cutoff means being a curved knife pivotally connected to the lower end of said sleeve, means holding said knife in radially outer retracted position during advancing movement of said cylinder into the ground and for swinging said knife inwardly of the cylinder only when the cylinder is fully advanced into the ground whereby rotation of said sleeve in said cylinder will cause said knife to cut off the plug of ground taken by the cylinder.

7. An apparatus for excavating plants, such as trees and shrubs and comprising in combination: a main frame, an elongated hollow member open at both ends and vertically reciprocable on said main frame, said hollow member being composed of sections separable laterally to permit said hollow member to be disposed around a plant, means for forcing said hollow member vertically into the ground when disposed around a plant, cutoff means carried by said hollow member near the bottom and adapted for cutting transversely across the bottom of the plug of ground encompassed by said hollow member when it is forced into the ground, first motor means operatively connected to said cylinder collectively for vertical movement thereof, second motor means for moving said cylinder sections laterally, said main frame including a first arm pivotal on a vertical axis at one end and having its other end above said cylinder, a second arm pivoted at one end to said other end of said first arm and extending along beneath said one arm and supportingly connected at its other end to said cylinder, third motor means connected to said first arm for swinging it about said vertical axis to move said cylinder laterally, and fourth motor means connected to said second arm to swing it about its pivotal connection with said first arm for rocking said cylinder when the cylinder engages the ground.

8. An apparatus according to claim 7, in which each cylinder half has a curved cutter element therein near the bottom, an arm near the top of each cylinder half connected to the respective cutter element, a stationary cam ring engaging said arms operable upon rotation of said cylinder to swing said cutter elements inwardly to cut off the plug of ground taken by the nonrotatable frame means supporting said cylinder halves for rotation, said cam ring being connected to said frame means, and means on said frame means energizeable for driving said cylinder in rotation.

9. An apparatus according to claim 8, in which said frame means comprises a horizontal frame arm for each cylinder half, means pivotally interconnecting said frame arms at a point remote from said cylinder, a support structure dependent from the said other end of said second arm and supportingly engaging said frame arms, motors connected to said frame arms for swinging them laterally to open and close said cylinder, and impacting means carried by said support structure adjacent said frame arms.

10. An apparatus for excavating plants, such as trees and shrubs and comprising in combination: a main frame, an elongated hollow member open at both ends and vertically reciprocable on said main frame, said hollow member being composed of sections separable laterally to permit said hollow member to be disposed around a plant, means for forcing said hollow member vertically into the ground when disposed around a plant, cutoff means carried by said hollow member near the bottom and adapted for cutting transversely across the bottom of the plug of ground encompassed by said hollow member when it is forced into the ground, said hollow member being a cylinder collectively in the form of superimposed axially short sections, each section comprising halves pivotally interconnected, and means for selectively closing said sections one at a time as said cylinder is driven into the ground.

11. An apparatus according to claim 10, in which a common pivot post supports all of said sections, an internal groove in the lowermost of said sections, and a cable connected at one end to said lowermost section near said post and leading upwardly through said post and receivable in said groove.

12. An apparatus for excavating plants, such as trees and shrubs and comprising in combination: a main frame, an elongated hollow member open at both ends and vertically reciprocable on said main frame, said hollow member being composed of sections separable laterally to permit said hollow member to be disposed around a plant, means for forcing said hollow member vertically into the ground when disposed around a plant, cutoff means carried by said hollow member near the bottom and adapted for cutting transversely across the bottom of the plug of ground encompassed by said hollow member when it is forced into the ground, said hollow member being a cylinder composed of sections, said main frame being a wheeled mobile frame, a first motor operatively connected between the frame and the cylinder for raising and lowering the cylinder collectively on the frame, a second motor operatively connected to cylinder sections individually for moving said cylinder sections toward and away from each other, said cylinder composed of sections respectively comprising sharp teeth on the bottom edge thereof to facilitate penetration of the cylinder into the ground, a support member being provided for each cylinder section and being connected thereto, a subframe including means movable interconnecting said support members, said subframe being guided on said main frame for vertical reciprocation thereon, said first motor being operatively connected between said main frame and said subframe, said second motor being connected between said support members, vibrator means mounted on said subframe and operable to impose vibrations in the vertical direction on said cylinder to cause it to advance downwardly into the ground, said cylinder having an upwardly facing internal shoulder therein near the bottom for supporting the lower end of wrap material for the plant being excavated, a sleeve including a downwardly facing shoulder above the top for engaging the upper end of wrap material, said cutoff means being disposed in said cylinder in the region of said upwardly facing shoulder so as to cut off said ground plug near the bottom end of said cylinder of wrap material, said cylinder having a segmented sleeve rotatable therein and extending from said upwardly facing shoulder upwardly and beyond the upper end of the cylinder, said downwardly facing shoulder being formed in said sleeve, means for rotating said sleeve in said cylinder, said cutoff means being a curved blade disposed horizontally near the lower end of said sleeve and having about the same radius of curvature as said sleeve and in its retracted position being disposed substantially coaxially with said sleeve, a vertical shaft in said sleeve and connected to one end of said blade so rotation of said shaft in the sleeve will swing said blade between its said retracted position and an extended position wherein the blade is turned so its other end is near the axis of said cylinder, means for rotating said sleeve in said cylinder, first means operable upon rotation of said sleeve in said cylinder from a predetermined starting position to a second position less than 360° away from said starting position for turning said shaft in one direction to swing said blade from its retracted position into its extended position so it will perform a cutoff operation as the said sleeve rotates, and second means operable during continued rotation of said sleeve in the same direction from said second position on to said starting position for turning said shaft in the opposite direction to swing said blade back to its retracted position.

13. An apparatus according to claim 12, in which said first and second means comprises pinion means frictionally connected to said shaft near the upper end of said sleeve, a first gear sector engaging said pinion means on one side during rotation of said sleeve from said starting position to its said second position, and a second gear sector engaging said pinion means on the other side during the continued rotation of said sleeve from its said second position on to its said starting position.